Nov. 24, 1964   A. J. P. SABBERWAL ET AL   3,157,938
CYLINDRICAL MILLING CUTTERS
Filed Sept. 18, 1962   2 Sheets-Sheet 1

United States Patent Office 3,157,938
Patented Nov. 24, 1964

3,157,938
CYLINDRICAL MILLING CUTTERS
Amar Jit Parkash Sabberwal, Denton, near Manchester, and John Hatton, West Gorton, Manchester, England, assignors to National Research Development Corporation, London, England, a corporation of Great Britain
Filed Sept. 18, 1962, Ser. No. 224,387
Claims priority, application Great Britain, Sept. 22, 1961, 34,101/61
5 Claims. (Cl. 29—103)

This invention relates to cylindrical milling cutters comprising at least one peripheral tooth.

Normally, efficient milling cutters used for slab milling and similar work have been provided with helical teeth of constant helix angle along the length of the cutters, and cutters with different constant helix angle have been available, so that a choice could be made to suit the conditions and the material to be machine; a larger helix angle would normally be employed also when it is desired to ensure a greater irregularity in the thickness of the chip or shaving.

In such cutters, however, it appears that there is a tendency for the wear of the cutter to be greater towards the trailing edge of the tooth, so that a cutter has tended to be rejected as "dull," when only a portion of each cutting edge has in fact been worn down.

It is an object of the present invention to provide an improved form of cutter.

In a cylindrical milling cutter, according to the invention, the peripheral tooth is of helical form, and the angle of the tooth varies along the length of the cutter. Preferably, the variation of the angle is continuous, from end to end of the tooth, and is uniform, the angle decreasing towards the trailing end of the tooth. Thus the angle between the tangent to the cutting edge at a point near the leading end and the plane through that point and the axis of the cutter is greater than the angle between the tangent to the cutting edge at a point near the trailing end and the axial plane through the latter point.

In machining the surface of a work piece which is narrower than the cutter, optimum cutting conditions for a given material may be achieved by adjustment in the axial position of the cutter relative to the workpiece; this latter facility is useful when different materials have to be cut since there may be no need to change the particular cutter on the machine; so that with only one cutter, a wider range of work may be carried out.

It is apparent that the invention is applicable to milling cutters where the angle of the tooth may be either right-handed or left-handed and also that the angles of the tooth between entry and exit can be selected to keep variations in wear below a certain predetermined value.

Figure 1:
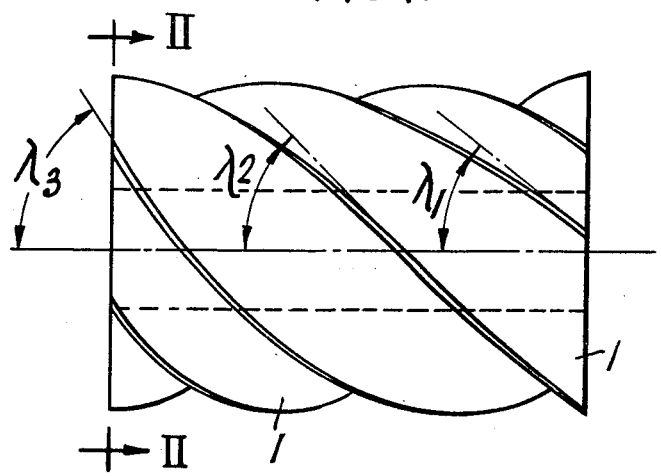

One particular embodiment of the invention in a milling cutter will now be described by way of example with reference to the accompanying drawing of which: FIGURE 1 shows an elevation of one form of the cutter according to the present invention, FIGURE 2 shows a view in the direction II—II in FIGURE 1; and FIGURE 3 shows another form of the cutter according to the present invention.

Figure 2:
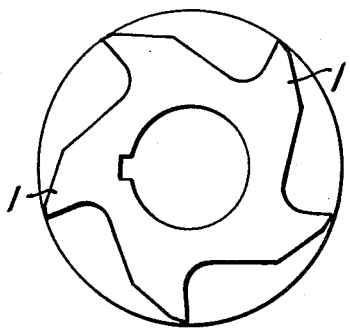

In FIGURES 1 and 2, the cutter, the diameter of which is about 1½ inches and the length approximately 2¼ inches, has five teeth, each having variable helical formation, the helix angle changing continuously from an angle $\lambda_3$ of about 50° at the leading end through a smaller angle $\lambda_2$ to an angle $\lambda_1$ of about 20° at the trailing end.

With such a cutter it is found that the life compared with normal cutters is prolonged, without sacrificing the conditions of the helical tooth formation, and also tooth grinding costs with such a cutter are reduced.

Figure 3:
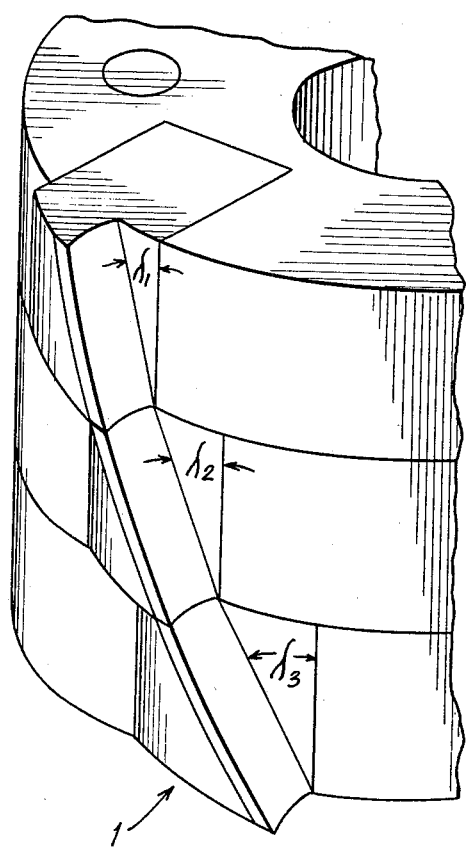

It will be evident that the actual formation of the tooth will be dependent to some extent on the conditions on which the cutter is to be used, and it may in fact be found that it is better in some cases that the variation of angle be non-uniform or segmental along the length of the cutter, as in the case of the cutter of FIG. 3. It may also be desirable in such latter cases to make the tooth in composite form.

We claim:

1. A cylindrical milling cutter comprising a central body portion and at least one cutting tooth supported on said central body portion, said cutting tooth being provided with a cutting edge which extends helically about the outer periphery of said central body portion, the helix angle of said cutting edge decreasing continuously from its leading end to its trailing end.

2. A cylindrical milling cutter comprising a central body portion and at least one cutting tooth supported on said central body portion, said cutting tooth being provided with a cutting edge which extends helically about the outer periphery of said central body portion from one end thereof to the other, the helix angle of said cutting edge decreasing continuously from its leading end to its trailing end.

3. A cylindrical milling cutter comprising a central body portion and at least one cutting tooth supported on said central body portion, said cutting tooth being provided with a cutting edge which extends helically about the outer periphery of said central body portion from one end thereof to the other, the helix angle of said cutting edge decreasing continuously and uniformly from its leading end to its trailing end.

4. A cylindrical milling cutter comprising a central body portion and at least one cutting tooth supported along said central body portion, said cutting tooth being provided with a cutting edge which extends helically about the outer periphery of said central body portion, the helix angle of said cutting edge decreasing in a continuous segmental manner along the length of said central body portion.

5. A cylindrical milling cutter comprising a central body portion and a plurality of interspersed cutting teeth distributed about and supported on said central body portion, said cutting teeth each being provided with a cutting edge which extends helically about the outer periphery of said central body portion, the helix angle of each such cutting edge decreasing continuously from its leading end to its trailing end.

References Cited in the file of this patent
UNITED STATES PATENTS

| | | |
|---|---|---|
| 1,840,852 | Schotthoefer | Jan. 12, 1932 |
| 1,988,770 | Alexander | Jan. 22, 1935 |
| 2,070,730 | Hellstrom | Feb. 16, 1937 |
| 2,124,818 | Gouverneur | July 26, 1938 |
| 2,344,954 | Aber | Mar. 28, 1944 |
| 2,381,540 | Horth | Aug. 7, 1945 |
| 2,649,648 | Pinto | Aug. 25, 1953 |

OTHER REFERENCES

"Composite Helix Angles Reduce Milling Cutter Wear," by K. Koeingsberger and A. J. P. Sabberwal, from the December 21, 1961, issue of Metalworking Production Magazine, pages 65–67.